United States Patent
Raaf et al.

(10) Patent No.: US 7,200,136 B1
(45) Date of Patent: Apr. 3, 2007

(54) METHOD FOR MAPPING FORMAT IDENTIFICATION BITS ONTO A FRAME WHICH IS TO BE TRANSMITTED USING A COMPRESSED MODE

(75) Inventors: Bernhard Raaf, Munich (DE); Christian Senninger, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 1078 days.

(21) Appl. No.: 10/130,964

(22) PCT Filed: Nov. 24, 2000

(86) PCT No.: PCT/DE00/04179

§ 371 (c)(1),
(2), (4) Date: May 22, 2002

(87) PCT Pub. No.: WO01/39399

PCT Pub. Date: May 31, 2001

(30) Foreign Application Priority Data

Nov. 24, 1999 (DE) ............................... 199 56 492

(51) Int. Cl.
*H04J 3/24* (2006.01)
*H04Q 7/24* (2006.01)
*H04L 12/28* (2006.01)
*H04L 12/56* (2006.01)

(52) U.S. Cl. .................. 370/349; 370/338; 370/389
(58) Field of Classification Search .............. None
See application file for complete search history.

(56) References Cited

U.S. PATENT DOCUMENTS

| 5,533,014 | A | * | 7/1996 | Willars et al. ............ 370/335 |
| 5,896,368 | A | * | 4/1999 | Dahlman et al. .......... 370/335 |
| 5,991,330 | A | * | 11/1999 | Dahlman et al. .......... 375/149 |
| 6,341,125 | B1 | * | 1/2002 | Hong et al. .............. 370/335 |
| 6,868,075 | B1 | * | 3/2005 | Narvinger et al. ........ 370/335 |

OTHER PUBLICATIONS

XP-002163232 3rd Generation Partnership Project (3GPP); Technical Specification Group Radio Access Network Multiplexing and channel coding (FDD) (3G TS 25.212 version 3.0.0).

* cited by examiner

Primary Examiner—Chirag G. Shah
(74) Attorney, Agent, or Firm—Bell, Boyd & Lloyd LLP

(57) ABSTRACT

A method for mapping format identification bits onto a frame which is to be transmitted using a compressed mode, in which more TFCI points are available than TFCI bits wherein in order to fill the excess TFCI points with bits as well and at the same time to achieve as high a performance capability as possible, it is proposed that the TFCI bits be repeated in a skillful manner for the uplink and/or downlink.

5 Claims, 3 Drawing Sheets

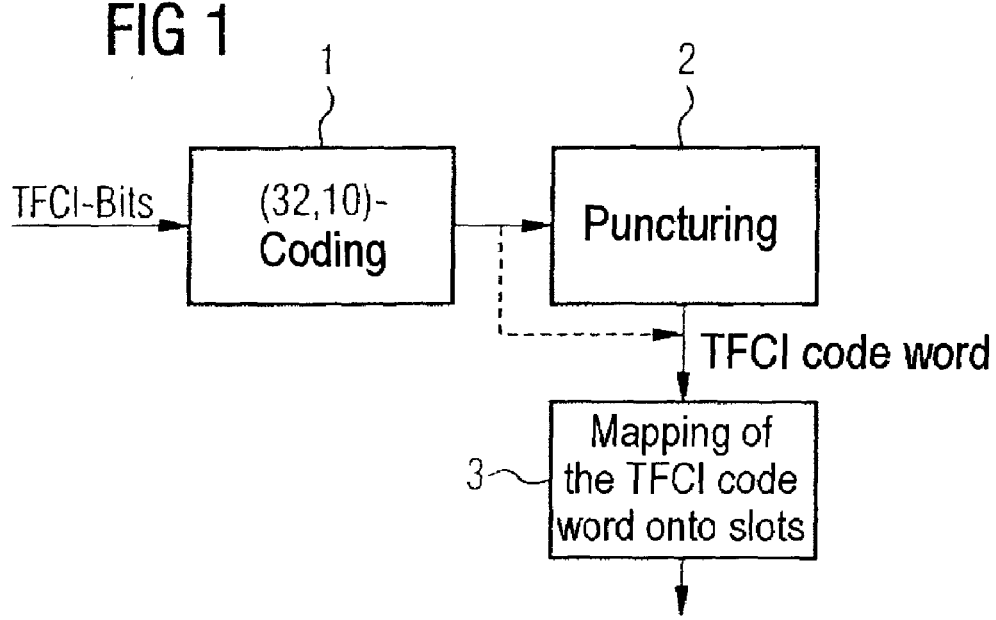
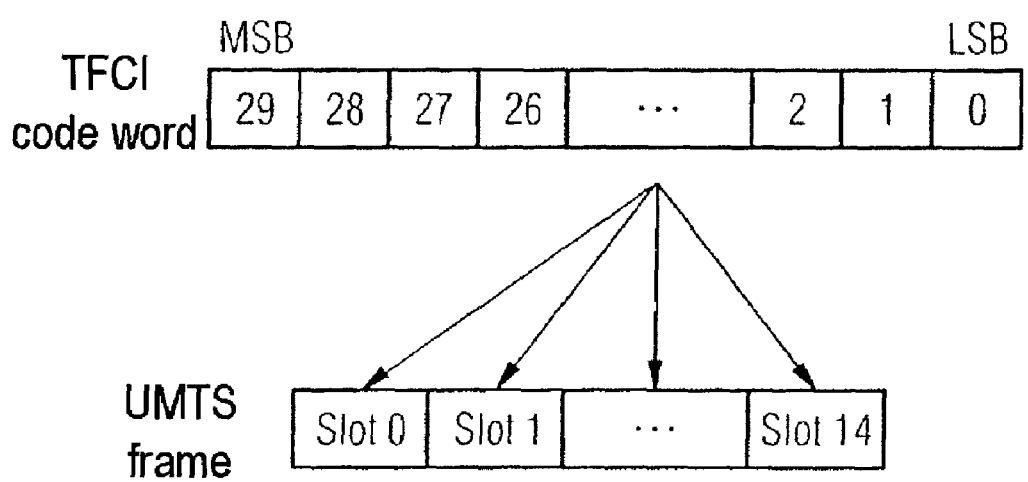

Transmission gap

Compressed UMTS frame

| Transmitted slots | TFCI bits per slot ($N_{TFCI}$) | TFCI bits per frame (D) |
|---|---|---|
| 15 | 2 | 30 |
| 14 | 3 | 42 |
| 13 | 3 | 39 |
| 12 | 3 | 36 |
| 11 | 3 | 33 |
| 10 | 3 | 30 |
| 9 | 4 | 36 |
| 8 | 4 | 32 |

FIG 5A

| Transmitted slots | TFCI bits per slot ($N_{TFCI}$) | TFCI bits per frame (D) TYPE A | TFCI bits per frame (D) TYPE B |
|---|---|---|---|
| 15 | 2 | 30 | 32 |
| 14 | 4 | 56 | 60 |
| 13 | 4 | 52 | 56 |
| 12 | 4 | 48 | 52 |
| 11 | 4 | 44 | 48 |
| 10 | 4 | 40 | 44 |
| 9 | 2+2 | 36 | 38 |
| 9 | 4 | 36 | 40 |
| 8 | 2+2 | 32 | 34 |
| 8 | 4 | 32 | 36 |

FIG 5B

| Transmitted slots | TFCI bits per slot ($N_{TFCI}$) | TFCI bits per frame (D) TYPE A | TFCI bits per frame (D) TYPE B |
|---|---|---|---|
| 15 | 8 | 120 | 128 |
| 14 | 16 | 224 | 240 |
| 13 | 16 | 208 | 224 |
| 12 | 16 | 192 | 208 |
| 11 | 16 | 176 | 192 |
| 10 | 16 | 160 | 176 |
| 9 | 16 | 144 | 160 |
| 8 | 16 | 128 | 144 |

METHOD FOR MAPPING FORMAT IDENTIFICATION BITS ONTO A FRAME WHICH IS TO BE TRANSMITTED USING A COMPRESSED MODE

BACKGROUND OF THE INVENTION

The present invention relates to a method for mapping format identification bits, that is to say so-called TFCI bits, onto a frame to be transmitted, particularly onto a compressed frame to be transmitted using the so-called compressed mode.

Mobile radio technology is subject to rapid development. At the moment, work is being carried out on the standardization of the so-called UMTS Mobile Radio Standard ("Universal Mobile Telecommunication System") for third-generation mobile radios.

Information to be transmitted via a mobile radio channel is normally transmitted in the form of a predefined frame and time slot structure. A UMTS frame includes 15 time slots "slots", with specific system information also being transmitted as well as the actual data within each frame. This system information includes, in particular, a known pilot bit sequence or training sequence, which the respective receiver can use to estimate the channel impulse response of the respective mobile radio channel, power control information in the form of one or more TPC bits (Transmit Power Control), whose contact is used to control the transmission power of the respective receiver, and format identification information in the form of so-called TFCI bits (Transport Format Combination Indicator).

On the basis of the current status of UMTS standardization, a TFCI code word is provided for each UMTS frame, including ten initially uncoded bits which are then coded using a second-order (32, 10) subcode of the Reed-Muller code, and are thus mapped onto a total of 32 bits. Of these 32 bits, bit nos. 0 and 16 are then punctured in the normal mode (in the normal mode or non-compressed mode), so that the TFCI code word now includes only 30 TFCI bits, which are then mapped or distributed uniformly with two TFCI bits in each case onto the individual time slots in the corresponding UMTS frame. These are allocated in such a way that the two most significant TFCI bits in the TFCI code word are allocated to the time slot no. 0 which is transmitted first within the UMTS frame, and the two least significant bits are allocated to the time slot no. 14, which is transmitted last within the frame. The more significant TFCI bit is then transmitted before the less significant TFCI bit within the individual time slots. The mapping or allocation of the TFCI bits in the TFCI code word onto or to the individual time slots in a frame is also referred to as mapping.

The term "puncturing" for the purposes of the present application also includes the removal or non-transmission of specific bits; in particular, the last bits.

In addition to normal transmission of information in uncompressed form, a compressed mode is also provided for data transmission. In the compressed mode, the information in the respective frame is transmitted in compressed form; in order to artificially produce a transmission gap, during whose duration the absence of transmitted information can be used, for example, for intermediate-frequency measurements in order to prepare for handover processes, etc.

In the compressed mode, at least eight time slots still must be left free per frame. The 30 TFCI bits must, in consequence, be distributed between the remaining time slots in the compressed mode. In order to allow this, the time slot format of the uplink control channel DPCCH (Dedicated Physical Control Channel) and of the downlink control channel DPCCH, as well as that of the downlink data channel DPDCH (Dedicated Physical Data Channel) must be matched.

In this context, various time slot formats have been proposed for the uplink DPCCH control channel for the compressed mode. These can be summarized by the table shown in FIG. 4, in which the number $N_{TFCI}$ of TFCI bits transmitted per time slot and the total number D of TFCI bits transmitted per frame are in each case shown for a different number of time slots or slots transmitted per frame in the compressed mode.

Corresponding proposals for time slot formats for the downlink in the compressed mode have also been made, which can be summarized by the tables shown in FIG. 5A and FIG. 5B, where FIG. 5A relates to a spread factor of between 128 and 512 being used for the corresponding channelization codes or spread codes, while FIG. 5B relates to spread factors of between 4 and 64. Analogously to FIG. 4, these tables each show the number $N_{TFCI}$ of TFCI bits transmitted per time slot and the total number D of TFCI bits transmitted per frame for a different number of time slots or slots transmitted per frame in the compressed mode, with a distinction also being drawn in this case between Type A and Type B transmission.

Since it is desirable to use a standard time slot format for each frame, situations may occur (as is indicated by the individual values for D in FIG. 4 and FIGS. 5A/B) in which more TFCI points are available in each frame than are actually required for the 30 TFCI bits.

For the uplink, that is to say for transmission from a mobile part to a base station, it has thus been proposed that selected TFCI bits be repeated in the compressed mode; that is to say, that they be reiterated, in order to fill the excess TFCI points, with, in particular, those bits which are sent immediately after the transmission gap that occurs in the compressed mode being repeated at free TFCI points for this purpose, in order that the repetition is carried out as effectively as possible. The reason for this is based on the fact that the transmission power control is very uncertain immediately after the transmission gap, so that the probability of a transmission being subject to interference is highest immediately after the transmission gap, so that these bits should be repeated, if possible. The repeated bits can, in this case, be determined via the following algorithm, where $c_k$ denotes the TFCI bits, $d_k$ denotes the repeated bits, D denotes the number of TFCI points available in total in the frame, and E denotes the index or the position of that TFCI point which immediately follows the transmission gap in the compressed mode:

$$d_{D-31} = c_{E \bmod 30}$$

$$d_{D-32} = c_{(E-1) \bmod 30}$$

$$d_{D-33} = c_{(E-2) \bmod 30}$$

.
.
.

$$d_0 = c_{(E-(D-31)) \bmod 30}$$

The bits are allocated to the individual time slots in the compressed frame in a descending sequence, with the TFCI bits $c_k$ being transmitted first, followed by the repeated bits $d_k$, that is to say the bit $c_{29}$ (Most Significant Bit (MSB) in the TFCI code word) being transmitted as the first bit in the TFCI code word, while do is transmitted as the last bit in the TFCI code word.

For the downlink, that is to say for transmission from a base station to a mobile part, it has in contrast been proposed to fill the free or excess TFCI points with so-called DTX bits (Discontinuous Transmission Bits) in the compressed mode. A DTX bit, in this case, corresponds to a bit which is not transmitted; that is to say, a bit whose energy is zero. A transmission pause with a time duration of one DTX bit is thus inserted at each of the appropriate points in the relevant time slots.

Against the background of the prior art described above, the present invention is directed toward a method for mapping TFCI bits onto a frame which is to be sent in a compressed mode, which makes it possible to improve the transmission power and the transmission reliability without any additional complexity.

SUMMARY OF THE INVENTION

According to the present invention, therefore, it is proposed that the excess TFCI points be filled by repetition of the TFCI bits following the transmission gap, but with these TFCI bits being repeated in the reverse sequence. This procedure is worthwhile since it can be assumed that those TFCI bits which are sent after the transmission gap have a lower bit error rate as the distance from the transmission gap increases. For this reason, it is better to repeat those TFCI bits which have the highest bit error rate owing to their proximity to the transmission gap in a time slot which is as far away from the transmission gap as possible.

The present invention is based on the knowledge that, in the compressed mode, the transmission gap interferes with the power control which stabilizes only as the distance from the transmission gap increases. The filling of additional TFCI points with TFCI bits (in the uplink and/or downlink) or DTX bits (in the downlink) is optimized on the basis of this fact. Furthermore, the present invention and exemplary embodiments are based on the knowledge that it is better to send the previously punctured TFCI bits than to repeat TFCI bits which were sent in poor power control conditions.

Additional features and advantages of the present invention are described in, and will be apparent from, the following Detailed Description of the Invention and the Figures.

BRIEF DESCRIPTION OF THE FIGURES

FIG. 1 shows a simplified block diagram of an arrangement for coding, puncturing and mapping TFCI bits onto a UMTS frame which is to be sent using the so-called compressed mode, which arrangement can be used in a transmitting apparatus according to the present invention.

FIG. 2 shows an illustration to explain the mapping of the TFCI bits onto a UMTS frame.

FIGS. 5A and 5B show tables listing various known time slot formats for a UMTS frame transmitted via a downlink connection in the compressed mode.

DETAILED DESCRIPTION OF THE INVENTION

Figures 3, 4:
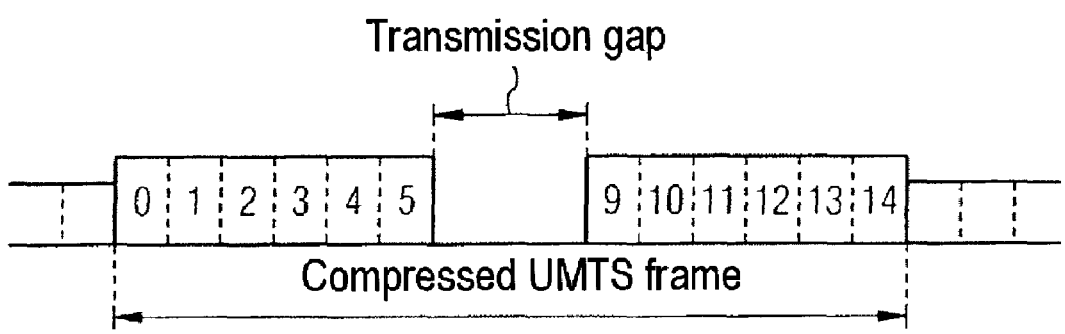
FIG. 3 shows an illustration to explain various exemplary embodiments of the present invention relating to the compressed mode.
FIG. 4 shows a table listing various known time slot formats for a UMTS frame transmitted via an uplink connection in the compressed mode.

Before describing in any more detail the various exemplary embodiments according to the present invention, the fundamental design of an arrangement for mapping TFCI bits onto a UMTS frame, as shown in FIG. 1, will be explained.

A (32, 10) coder 1 is supplied with uncoded TFCI bits, which are to be mapped onto the respective UMTS frame. In principle, the number of uncoded TFCI bits is variable and is defined via appropriate signaling at the start of a connection. However, if there are less than ten uncoded TFCI bits, the corresponding TFCI word is filled with zeros to make a total of ten bits, with the more significant bits being set to zero in this case. This ensures that the (32, 10) coder 1 is always supplied with a TFCI word having ten TFCI bits.

The (32, 10) coder 1 codes the TFCI word supplied to it using a second-order (32, 10) subcode of the so-called Reed-Muller code. The corresponding (31-10) coder 1 is, in this case, structured such that the TFCI code word emitted from the (32, 10) coder 1 is formed by a linear combination (controlled by the uncoded TFCI bits) of ten different basic sequences.

The TFCI code word which is emitted from the (32, 10) coder 1 and which now includes 32 bits is then supplied to a puncturing unit 2, in which the bit no. 0 and the bit no. 16 are punctured; that is to say, they are removed from the TFCI code word. The punctured TFCI code word resulting from this now has only 30 TFCI bits.

The 30 TFCI bits are supplied to a unit 3 whose task is to assign these bits in the normal mode (that is to say, for uncompressed transmission) or in the compressed mode (that is to say, for compressed transmission) to the individual time slots or slots in the respective UMTS frame (see FIG. 2).

As has already been described, the 30 TFCI bits in the normal mode are distributed uniformly between the 15 time slots in the respective UMTS frame, with the two most significant TFCI bits no. 29 and no. 28 being mapped onto the time slot no. 0 which is transmitted first in time, while the two least significant bits no. 1 and no. 0 are mapped onto the time slot no. 14 which is transmitted last within the frame.

Exactly the same configuration of TFCI bits to be transmitted also can, of course, be achieved in another way. For example, the numbering of the bits is purely a conventional question, and the MSB and LSB also could be defined in a different sequence. Furthermore, the puncturing operations do not need to relate to the bit nos. 0 and 16, since other bits also may be punctured.

On the basis of another method of representation, the elements of the masks used for the Reed-Mueller code also may be reorganized so that the bits to be punctured may be placed at any desired points; particularly at the end of the TFCI code word. All these alternative, equivalent forms of representation are likewise within the scope of the present invention, even if they are not mentioned explicitly in the following text.

However, in the compressed mode and as shown in FIG. 3, there is a transmission gap in the corresponding frame in which no information is transmitted. In the example shown in FIG. 3, this transmission gap covers the time slots no. 6–8. As has already been described, this requires that the time slot format be adapted appropriately so that, in certain of these adapted formats, there are more available TFCI points than TFCI bits (see also FIG. 4 and FIGS. 5A/5B).

In the following text, various options for filling these excess TFCI points are proposed both for the uplink and for the downlink, and the exemplary embodiments proposed in the following text for the uplink can also be used for the downlink. Furthermore, the individual exemplary embodiments also may be combined with one another.

First of all, a number of exemplary embodiments of the present invention for the uplink will be explained in the following text.

According to a first exemplary embodiment, in the situation where there are more TFCI points than TFCI bits available in the compressed mode, it is proposed that the excess TFCI bits should not be filled immediately by repetition, but that the TFCI points which are still unfilled should first of all be filled with the bits no. 0 and no. 16, which were originally punctured by the puncture unit 2, in the original TFCI code word. These two bits are preferably placed at the end of the corresponding UMTS frame. Only after these bits have been mapped onto the UMTS frame are the TFCI points which still remain free filled by repetition, and this is carried out analogously to the prior art described initially such that the 30 bits in the TFCI code word are mapped onto the TFCI points which are transmitted first in time, while the repeated bits are allocated to the later TFCI points in the frame.

This procedure results in a change to the previously proposed algorithm for determining the additional TFCI bits $d_k$ as follows, where E denotes the index of the TFCI point which immediately follows the transmission gap, $c_k$, where $k=0 \ldots 29$, denotes the 30 TFCI bits in the punctured TFCI code word, $c_{30}$ and $c_{31}$ denotes the two originally punctured bits no. 6 and no. 16 in the TFCI code word emitted from the coder 1, and D denotes the number of TFCI points in the entire frame:

$d_{D-31} = c_{E \bmod 30}$ $d_{D-32} = c_{(E-1) \bmod 30}$ $d_{D-33} = c_{(E-2) \bmod 30}$

.
.
.

$d_2 = c_{(E-(D-33)) \bmod 30}$ $d_1 = c_{31}$ $d_0 = c_{30}$

For the example shown in FIG. 3, this results in the following procedure for mapping the TFCI bits onto the respective frame. Since the transmission gap covers three time slots, only twelve time slots are sent, so that, on the basis of the table shown in FIG. 4, three TFCI bits should be transmitted in each time slot, with a total of 36 TFCI bits being transmitted in the entire frame.

According to the algorithm described above, the TFCI bits $c_{29}$ to $c_{12}$ are initially distributed between the first time slots no. 0 to no. 5 and the TFCI bits $c_{11}$ to $c_0$ are initially distributed between the next time slots no. 9 to no. 12. Thus, once all the TFCI bits in the punctured TFCI code word have been allocated, the TFCI bits $c_{11}$, $c_{10}$, $c_{09}$ are repeated in time slot no. 13, and the originally punctured TFCI bits $c_{30}$ and $c_{31}$ are mapped onto the last time slot no. 14, with the TFCI bit $c_{08}$ also being repeated in the time slot no. 14.

This procedure is advantageous since it is better to send the previously punctured bits in the TFCI (32, 10) code word than to repeat bits which have been sent in poor conditions, in terms of power control, owing to the transmission gap which exists in the compression mode.

The exemplary embodiment described above also can be modified such that the originally punctured bits are not placed in the last time slot in the UMTS frame but are sent directly after the transmission gap. Furthermore, as in the prior art, the TFCI bits which then immediately follow the transmission gap are repeated. This procedure has the advantage that those bits which are normally punctured in any case are sent at the TFCI points whose transmission conditions are "poor."

Based on the example shown in FIG. 3 and according to this exemplary embodiment, the TFCI bits $c_{29}$ to $c_{12}$ are initially distributed between the first time slots no. 0 to no. 5. The TFCI points in the time slot no. 9 are filled with the originally punctured bits $c_{30}$ and $c_{31}$ as well as the TFCI bit $c_{11}$. The TFCI bits $c_{10}$ to $c_2$ are assigned to the time slots no. 10 to 12. The time slot no. 13 is filled by the TFCI bits $c_{01}$ and $c_0$. Those TFCI points which are then still available in the time slots no. 13 and no. 14 are filled, as has already been described above, by the TFCI bits which immediately follow the transmission gap, so that bit $c_{30}$ is repeated in time slot no. 13, and the bits $c_{31}$, $c_{11}$, $c_{10}$ are repeated in the time slot no. 14.

It may be expected that those TFCI bits which are sent after the transmission gap have a lower bit error rate as their distance from the transmission gap increases, since the power control can stabilize once again as the distance from the transmission gap increases. A further good option for filling the available TFCI points in the compressed mode is to repeat those TFCI bits which are transmitted immediately after the transmission gap and which have the greatest error probability in that time slot which is furthest away from the transmission gap. It is thus advantageous to repeat those TFCI bits which immediately follow the transmission gap in the reverse sequence (and not in the same sequence, as before).

The algorithm described initially for determining the repeated bits $d_k$ in consequence change as follows:

$d_{D-31} = c_{(E-(D-31)) \bmod 30}$ $d_{D-32} = c_{(E-(D-32)) \bmod 30}$ $d_{D-33} = c_{(E-(D-33)) \bmod 30}$

.
.
.

$d_1 = c_{(E-1) \bmod 30}$ $d_0 = c_{E \bmod 30}$

For the example shown in FIG. 3, this results in the TFCI bits $C_{29}$ to $c_{12}$ being initially distributed between the first time slots no. 0 to no. 5, and the TFCI bits $c_{11}$ to $c_0$ being initially distributed between the next time slots no. 9 to no. 12. Thus, once all the TFCI bits in the punctured TFCI code word have been allocated, those TFCI bits which then immediately follow the transmission gap are repeated in the reverse sequence in order to fill those TFCI points which are still free; that is to say, the TFCI bits $c_{06}$, $c_{07}$, $c_{08}$ are repeated in the time slot no. 13, and the TFCI bits $c_{09}$, $c_{10}$, $c_{11}$ are repeated in the time slot no. 14.

It is particularly advantageous for this exemplary embodiment to be combined with the first exemplary embodiment, that is to say for the two originally punctured TFCI bits $c_{30}$ and $c_{31}$ to be sent in the last time slot, while those TFCI bits which immediately follow the transmission gap are repeated in the reverse sequence in order to fill the free TFCI points.

The following algorithm is therefore used to determine how the TFCI points $d_k$ are filled:

$$d_{D-31} = c_{(E-(D-33)) \bmod 30}$$

$$d_{D-32} = c_{(E-(D-34)) \bmod 30}$$

.
.
.

$$d_2 = c_{E \bmod 30}$$

$$d_1 = c_{31}$$

$$d_0 = c_{30}$$

For the example shown in FIG. 3, this results in the TFCI bits $c_{29}$ to $c_{12}$ being initially distributed between the first time slots no. 0 to no. 5 and the TFCI bits $c_{11}$ to $c_0$ being additionally distributed between the next time slots no. 9 to no. 12. Thus, once all the TFCI bits in the punctured TFCI code word have been allocated, those TFCI bits which then immediately follow the transmission gap are repeated in the reverse sequence, and the originally punctured bits $c_{30}$ and $c_{31}$ are sent in the last time slot in order to fill the TFCI points which are still free; that is to say, the TFCI bits $c_{08}$, $c_{09}$, $c_{10}$ are repeated in the time slot no. 13, while the originally punctured TFCI bits $c_{30}$ and $c_{31}$ as well as the repeated TFCI bit $c_{11}$ are assigned to the time slot no. 14.

As has already been described, the TFCI bits in the TFCI (32, 10) code word, which has been punctured twice, are usually distributed between the first TFCI points in the respective frame in the compressed mode, while those TFCI points which are then still available are filled by repetition. If at least 32 TFCI points are available, depending on the format respectively chosen for the compressed mode (see FIG. 4), there is a further option for filling the TFCI points in which the entire unpunctured (32, 10) code word can be sent immediately, and in which any TFCI points which are still free are only then filled by repetition. In this case, the TFCI code word supplied from the coder 1 would retain its original length and sequence since, as indicated by dashed lines in FIG. 1, no puncturing is carried out.

For the example shown in FIG. 3, this results in the TFCI bits $c_{30}$ to $c_{15}$, $c_{31}$ and $c_{14}$ being initially distributed between the first time slots no. 0 to no. 5, and the TFCI bits $c_{13}$ to $c_{02}$ being initially distributed between the next time slots no. 9 to no. 12. In this case, it should be noted that $c_{30}$ denotes the bit no. 0 and $c_{31}$ denotes the bit no. 16 in the unpunctured TFCI code word emitted from the coder 1 (FIG. 2 shows only the punctured TFCI code word). Those TFCI bits $c_{01}$ and $c_0$ which still remain are sent, first of all in the time slot no. 13. Those TFCI points which are then still free in the time slot no. 13 and in the time slot no. 14 are filled by repetition, in which case the previously described exemplary embodiments can be used once again for the repetition. In the present situation, those TFCI bits which immediately follow the transmission gap are once again repeated, so that the TFCI bit $c_{13}$ is repeated in the time slot no. 13, while the TFCI bits $c_{12}$ to $c_{10}$ are repeated in the time slot no. 14.

In the following text, exemplary embodiments of the present invention for filling those TFCI points for the downlink which are available in the compressed mode will be explained.

As has already been explained, so-called DTX bits can be used for this purpose.

Within the scope of the present invention, it is now proposed that these DTX bits should not be distributed between those TFCI points which still remain at the end of the respective frame after transmission of the punctured TFCI code word, but that these DTX bits should be transmitted immediately after the transmission gap that occurs in the compressed mode. As such, as many DTX bits as there are excess TFCI points in the frame are transmitted immediately after the transmission gap. The remaining TFCI points in the frame are filled with the bits of the punctured TFCI code word.

This procedure has the advantage that the DTX bits are used for those TFCI points in which the probability of transmission being subject to interference is greatest, owing to the proximity to the transmission gap.

If, as is shown in FIG. 3, a frame is transmitted with a transmission gap covering three time slots (by way of example, for a spread factor of 256) according to the table shown in FIG. 5A, four TFCI points are available in each time slot (the downlink frame structure is assumed to be of Type A). On the basis of the exemplary embodiment described above, the TFCI bits $c_{29}$ to $c_{06}$ in the punctured TFCI code word are accordingly distributed between the time slots no. 0 to no. 5. 16 DTX bits are sent in the time slots no. 9 to no. 12, while two DTX bits are sent, first of all, in the time slot no. 13, followed by the TFCI bits $c_{05}$ and $c_{04}$. Finally, the remaining TFCI bits $c_{03}$ to $c_0$ in the punctured TFCI code word are sent in the last time slot no. 14.

Should there be fewer time slots after the transmission gap than the number required for the DTX bit, those DTX bits which cannot be transmitted after the transmission gap can be allocated to the time slots before the transmission gap. In this case, they may, in principle, be distributed in any desired way, in which case it is advantageous to distribute the DTX bits as uniformly as possible. As a further embodiment variant, only some of the DTX bits may be inserted immediately after the transmission gap, with the remaining DTX bits being allocated to the other time slots before and after the transmission gap. This is particularly advantageous when more time slots are available after the transmission gap than are required for stabilization of the power control.

One specific embodiment of the present invention provides for 30 bits of the TFCI code word to be mapped initially onto the frame to be transmitted, in the compression mode. Furthermore, two originally punctured bits or two bits which are not intended to be transmitted in the normal mode (during normal operation and in the uncompressed mode) are mapped onto the frame to be transmitted. If, particularly in the uplink, the number of format identification points available in the corresponding compressed frame exceeds the limit of 32 format identification points, then TFCI bits are mapped repeatedly onto the frame to be transmitted; in particular, those TFCI bits which are sent shortly after the transmission gap are mapped repeatedly onto the frame to be transmitted (they are repeated). This repeated mapping is, in this case, carried out in reverse sequence to that in which these TFCI bits were first mapped.

If, particularly in the downlink, the number of format identification points available in the corresponding compressed frame exceeds the limit of 32 format identification points, then DTX bits are mapped repeatedly onto the frame to be transmitted.

Finally, it should be mentioned once again that the exemplary embodiments described above with reference to the uplink also can, in principle, be used for the downlink. Furthermore, the present invention has been described above on the basis of the use in a mobile radio transmitter. The present invention also may, of course, be extended to mobile radio receivers, which shall be designed appropriately for reception and evaluation of a signal which is processed according to the present invention and is then transmitted.

Indeed, although the present invention has been described with reference to specific embodiments, those of skill in the art will recognize that changes may be made thereto without departing from the spirit and scope of the present invention as set forth in the hereafter appended claims.

The invention claimed is:

1. A method for transmitting in a wireless network, comprising mapping format identification bits onto a frame which is being transmitted using a compressed mode, the method comprising the steps of:

sending information, contained within a frame which is being transmitted using the compressed mode, compressed in time such that there is a transmission gap, which is not filled with information, within the compressed frame;

mapping format identification bits in the compressed mode onto a specific number of format identification points which are available in a corresponding compressed frame, with the specific number being greater than a number of format identification bits;

mapping the format identification bits following the transmission gap repeatedly after a first mapping of the format identification bits onto corresponding format identification points, in order to fill all the format identification points with a format identification bit; and mapping, after the first mapping of the format identification bits, the format identification bits following the transmission gap repeatedly in a reverse sequence, in order to fill the format identification points which are still unfilled in the compressed frame after the first mapping process with a format identification bit.

2. A method transmitting in a wireless network as claimed in claim 1, wherein, during the first mapping process, the format identification bits are mapped onto the format identification points in the compressed frame which are being transmitted first in time.

3. A method for transmitting in a wireless network as claimed in claim 2, wherein, during the first mapping process, the format identification bits are mapped according to a respectively associated significance onto the corresponding format identification points in the compressed frame, with a most significant format identification bit being mapped onto the identification point which is being transmitted first in time in the compressed frame.

4. A method for transmitting in a wireless network as claimed in claim 1, wherein the method is carried out before sending the compressed frame via an uplink connection in a UMTS mobile radio system.

5. A method for transmitting in a wireless network as claimed in claim 1, wherein the method is carried out before sending the compressed frame via a downlink connection in a UMTS mobile radio system.

* * * * *